Figure 1:
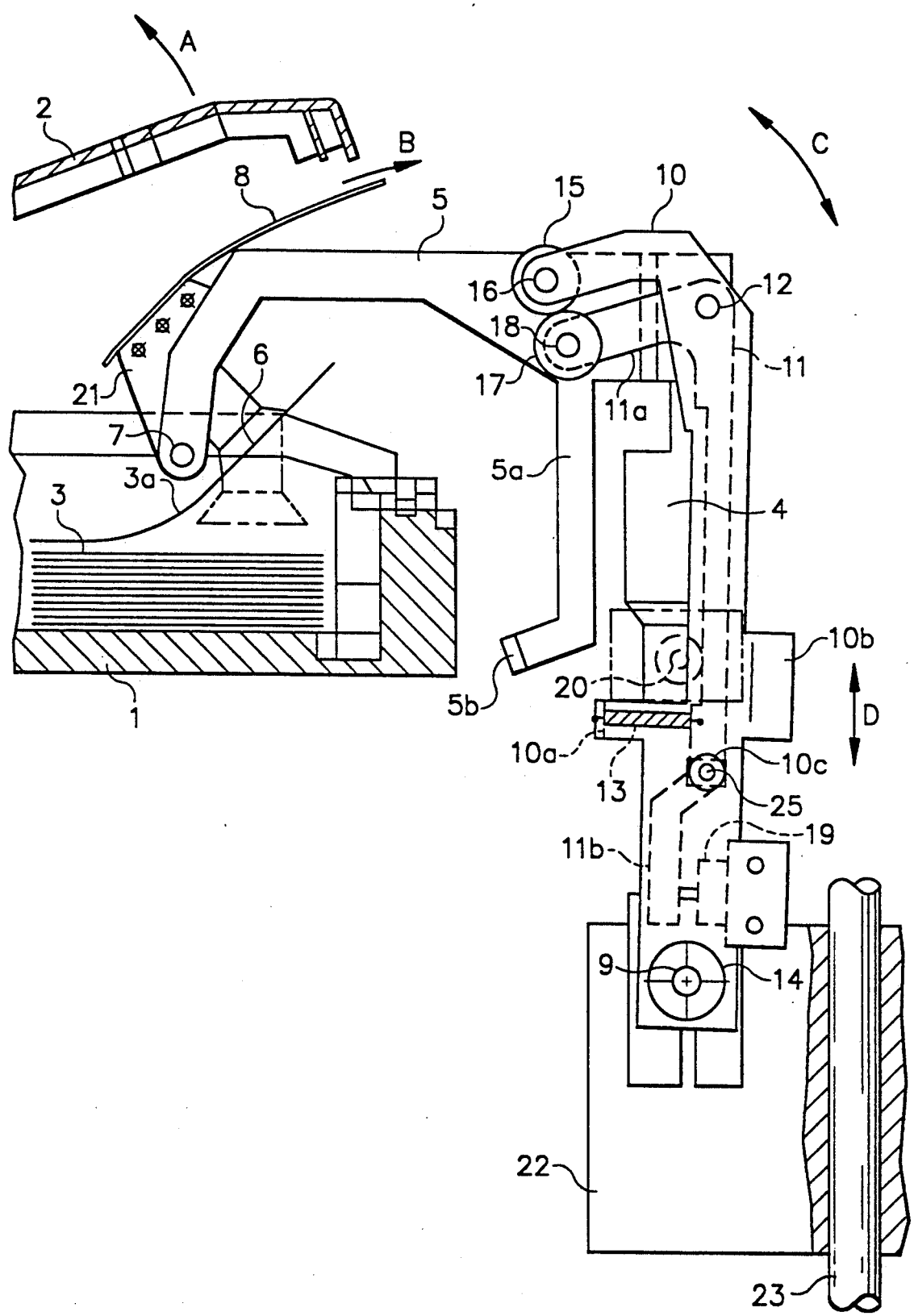

United States Patent
Blank et al.

[11] Patent Number: 5,303,912
[45] Date of Patent: Apr. 19, 1994

[54] DEVICE FOR DETECTING DOUBLE SHEET FILMS

[75] Inventors: Kurt Blank, Stuttgart; Friedrich Ueffinger, Schorndorf-Weiler, both of Fed. Rep. of Germany

[73] Assignee: Eastman Kodak Company, Rochester, N.Y.

[21] Appl. No.: 915,713

[22] PCT Filed: Nov. 15, 1991

[86] PCT No.: PCT/EP91/02155
§ 371 Date: Jul. 21, 1992
§ 102(e) Date: Jul. 21, 1992

[87] PCT Pub. No.: WO92/09924
PCT Pub. Date: Jun. 11, 1992

[30] Foreign Application Priority Data
Nov. 23, 1990 [DE] Fed. Rep. of Germany ....... 4037377

[51] Int. Cl.⁵ .............................................. B65H 7/12
[52] U.S. Cl. .................................... 271/263; 271/262
[58] Field of Search ............................ 271/262, 263

[56] References Cited
U.S. PATENT DOCUMENTS

| | | | |
|---|---|---|---|
| 3,744,787 | 7/1973 | Morrison | 271/263 X |
| 3,885,780 | 5/1975 | Morrison | 271/263 X |
| 3,993,303 | 11/1976 | Riedl et al. | 271/263 |
| 4,462,585 | 7/1984 | Gieson et al. | 271/263 X |
| 4,506,876 | 3/1985 | Nishibori | 271/263 X |
| 4,531,726 | 7/1985 | Bornstein | 271/263 |
| 4,533,133 | 8/1985 | Hams | 271/9 |
| 4,697,246 | 9/1987 | Zemke et al. | 271/263 X |
| 4,763,890 | 8/1988 | Zimmerman et al. | 271/30.1 |

FOREIGN PATENT DOCUMENTS
2940631 4/1981 Fed. Rep. of Germany .
8806749 9/1988 World Int. Prop. O. .

*Primary Examiner*—H. Grant Skaggs
*Assistant Examiner*—Carol Lynn Druzbick
*Attorney, Agent, or Firm*—Dana M. Schmidt

[57] ABSTRACT

On a suction device (4, 5, 6, 21) for separating sheet films (3a) from a sheet-film stack (3), a thickness sensor (10, 11, 15, 17, 19) is mounted so as to be pivotable together with said suction device. The suction device (6, 21) releases the sheet film (3a) to be removed from a sheet-film stack (3) by bending its front section. The thickness sensor (10, 11, 15, 17) which has a forklike design is spring-biased to move onto the bent area of the sheet film (3a) still located on sheet-film stack (3). The thickness sensor comprises two levers (10, 11) with rollers (15, 17), one lever (11) being pivotable relative to the other lever (10). Depending on its path of pivotal movement the pivotably mounted lever (11) actuates a switch (19). If there is more than one sheet film (3a) between the rollers (15, 17) of the levers (10, 11) switch (19) is actuated which interrupts the sheet-film removal operation and causes its repetition. Even if the removal operation must be repeated several times the sheet film (3a) to be removed remains on the sheet-film stack (3), which prevents it from being subjected to any undesired wear and tear.

10 Claims, 3 Drawing Sheets

DEVICE FOR DETECTING DOUBLE SHEET FILMS

The invention relates to a device for detecting double sheets in an apparatus for separating a sheet film from a sheet-film stack, preferably a stack contained in a supply magazine, with a suction device which for releasing the film to be removed bends the front area of the film, which is engaged by the suction device, with respect to the sheet-film plane.

In a device of this type which is known from DE-OS 37 05 851, a sheet-film loaded in a supply magazine is engaged in its front section by suction elements and separated from the underlying sheet-film stack in that the suction elements are tilted. Subsequently the sheet film is removed from the supply magazine by the pivotally guided suction elements and moved through a light barrier which is arranged in its path of movement and detects whether or not more than one sheet film was attracted. If the light barrier detects that there is more than one sheet film the removal operation is interrupted by a control device, the direction of pivotal movement of the suction elements is reversed and the sheet films are returned to, and deposited in the supply magazine. By completely repeating the removal operation several removal attempts are made in order to release the second sheet film adhering to the first by repeatedly tilting the suction elements. During the repeated removal attempts by which the sheet film is to be released in this known device the sheet film is affected in an undesired manner by the relative movement between the sheet film to be removed and the supply stack as well as by the friction occurring at the guide means.

It is the object of the invention to provide a device of the generic type such that double sheet films are detected without the film being damaged.

In accordance with the invention this object is attained in that a thickness sensor is moved into the bent-off area of the sheet film while said film is still located on the sheet-film stack.

According to an advantageous modification of the invention the thickness sensor consists of a first lever which can be pivoted jointly with the suction device and on which a second lever is pivotally mounted which actuates a switch, rollers sensing the upper and the lower face respectively of the sheet film being rotatably mounted on said levers.

Advantageously pivotal movement of the levers of the thickness sensor is limited to a range between a sensing position and an initial position, with the initial position being defined by an abutment which can be electromagnetically operated and which releases the thickness sensor to assume its sensing position.

Preferably the thickness sensor is returned to its initial position in that it is positively engaged, and taken along by the suction device.

Thanks to the design and arrangement of the thickness sensor in accordance with the invention, it is detected even prior to the removal of a sheet film from the sheet-film stack whether a second sheet film adheres to the first sheet film so that the sheet film is initially not withdrawn from the sheet film stack in such a case. Only when the thickness sensor has detected that a single sheet film has been properly engaged is the actual film removal operation initiated so that the sheet film is only transported when it has been separated in a functionally correct manner and in this way is protected from damage.

Figure 2:
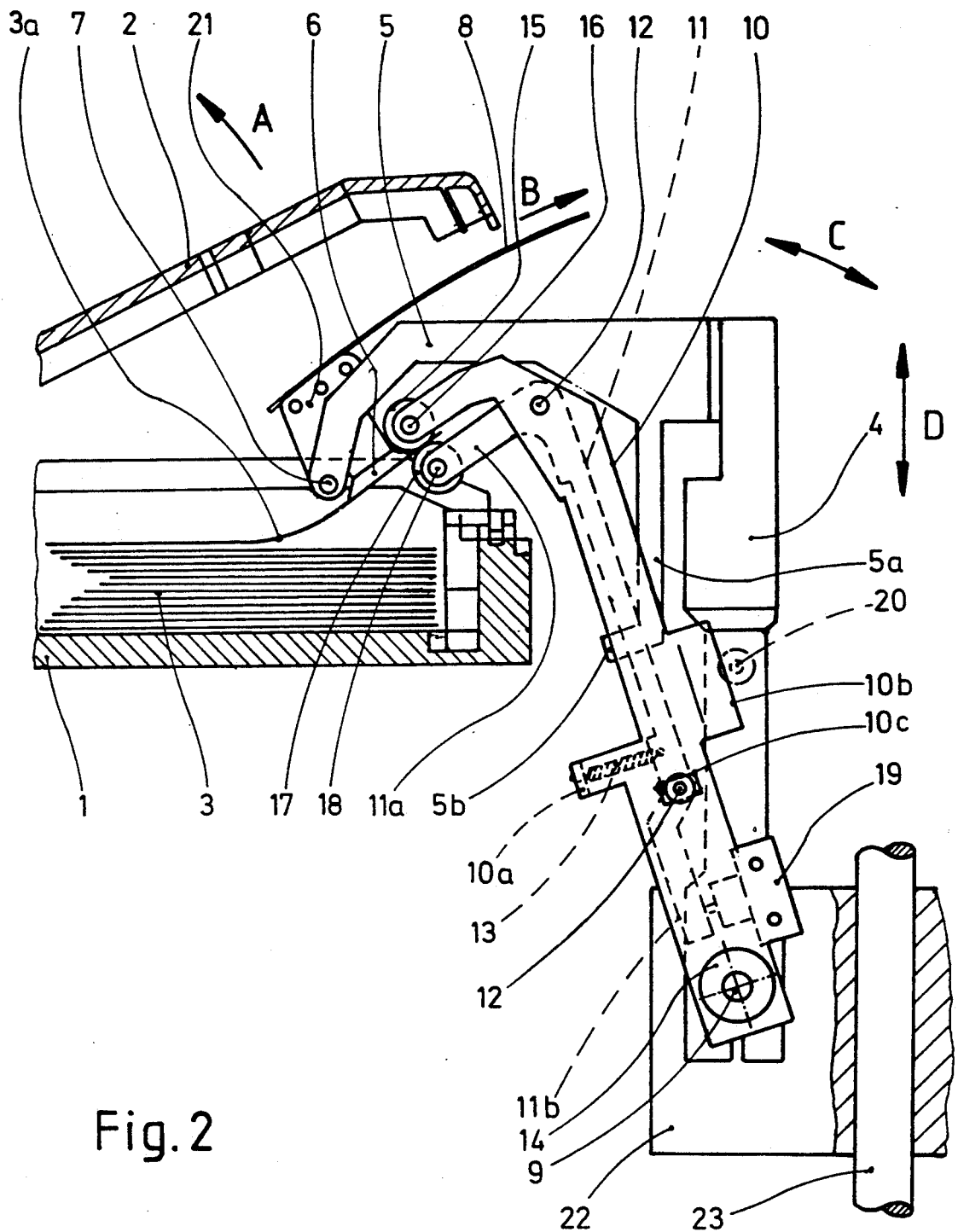

Further features and advantages can be inferred from an embodiment of the invention illustrated in the drawing and from the subclaims. The drawing shows schematically in FIG. 1 a lateral view of the device in its initial position;

FIG. 2 a view of the device according to FIG. 1 in its sensing position, and

Figure 3:
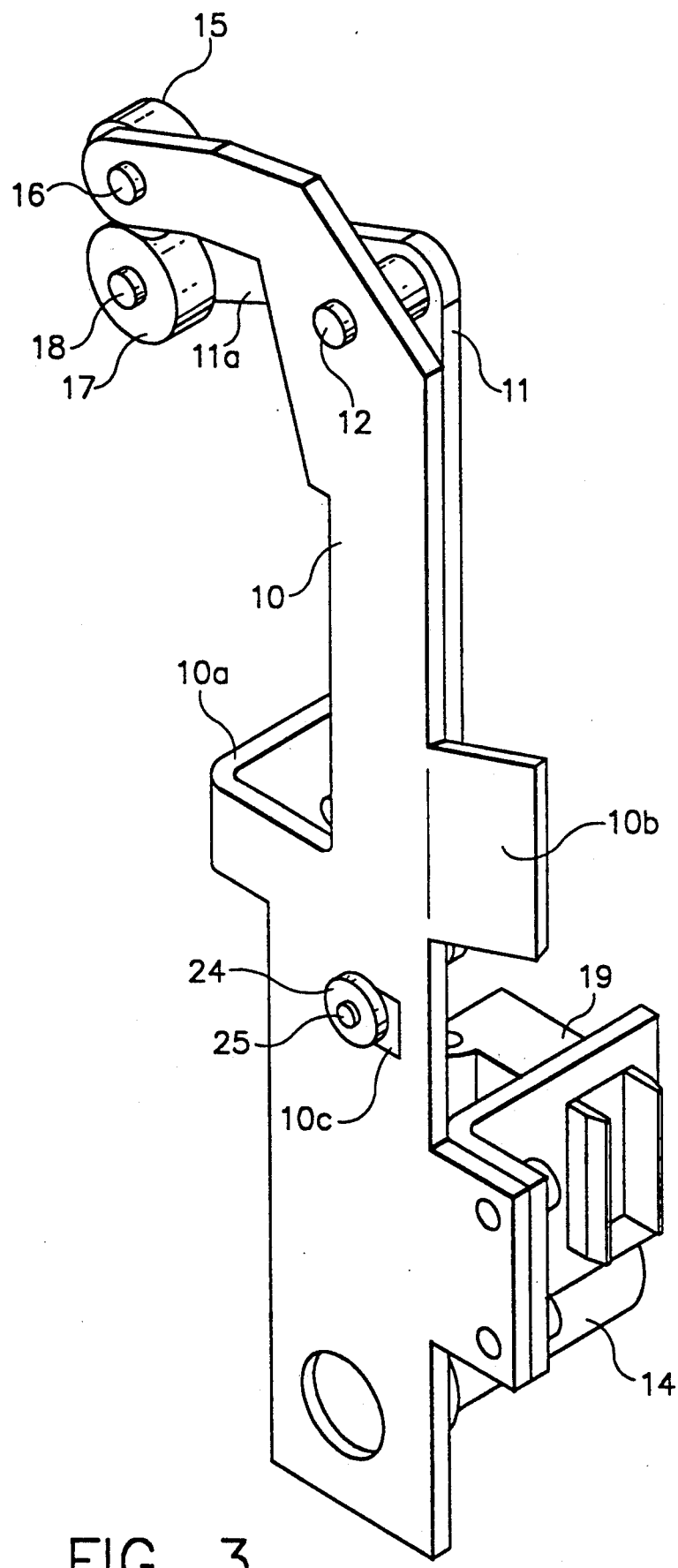

FIG. 3 an oblique view of details of the device according to FIG. 1.

The invention is described in connection with a device for removing sheet films 3a from a sheet-film supply magazine 1, said device having a suction plate 21 with a plurality of suction elements 6.

Such a device is known for example from an apparatus for loading sheet film into a sheet-film magazine which has been disclosed in DE 37 05 851, claim 1.

The description of the invention is confined to its most essential features.

The supply magazine 1 which can be closed in a light-tight manner by a lid 2 hinged to it for pivotal movement in the direction of the arrows "A" houses a sheet-film stack 3.

The device for separating and removing the sheet films substantially consists of a mounting arm 4 on which an outrigger 5 is mounted at whose end a suction plate 21 with a plurality of suction elements 6 is pivotally mounted.

The thickness sensor for detecting double sheet films substantially comprises two sensing levers 10 and 11 having rollers 15 and 17 and being pivotable relative to each other, one sensing lever 11, 11a being adapted to operate a switch 19.

The mounting arm 4 and the sensing lever 10 which hereinafter is referred to as forward sensing lever 10, are movable relative to each other and mounted for pivotal movement in the direction of the arrows "C" about a joint motor shaft 9 of an electric motor not illustrated. Motor shaft 9 is mounted to a vertically movable guide portion 22 schematically illustrated in FIGS. 1 and 2 and driven by the motor to move along a guide column 23 in the directions of the arrows "D".

Two outriggers 5 arranged at a distance from, and parallel with each other (of which only the forward outrigger 5 is visible) are mounted on the mounting arm 4, and the suction plate 21 with its suction elements 6 and air jets not illustrated is disposed for pivotal movement about a journal 7 between the ends of said outriggers which extend into the open supply magazine 1. Suction plate 21 is held in engagement with an electromagnetically operated cable line 8 which can pivot the suction bar 21, which is spring-biased into the inclined position illustrated, into a position in which it is aligned in parallel with the sheet-film plane (shown in dash-dotted lines in FIG. 1).

The forward outrigger 5 comprises an arm 5a with a bent-off projection 5b which according to FIG. 2 serves as an abutment for the forward sensing lever 10 when said lever is in its sensing position. The forward sensing lever 10 is mounted for free rotation about a bushing 14 on motor shaft 9 and is biased counterclockwise by a rotary spring not illustrated. At the free end of forward sensing lever 10, a roller 15 is mounted for rotation about a journal 16, and the two-armed rear sensing lever 11 is pivotally mounted adjacent thereto about a journal 12, also see FIG. 3. The two sensing levers 10 and 11 are mounted in an area of the motor shaft 9 adjacent to suction device 4, 5, 6, 21 such that they are able to sense the smallest film size possible.

A roller 17 which is arranged opposite to roller 15 of the forward sensing lever 10 is mounted for rotary movement about a journal 18 on a first arm 11a of rear sensing lever 11. The rear sensing lever 11 is biased by a tension spring 13 which is hooked to a bent off portion 10a of the forward sensing lever 10 and engages a second arm 11b of the rear sensing lever 11 such that roller 17 is urged into contact with roller 15 by slight pressure.

A switch 19 secured to the forward sensing lever 10 is operated by the second arm 11b of the rear sensing lever 11 as soon as the distance between the two rollers 15, 17 exceeds a predetermined value, i.e. the thickness of a single sheet film. In the area between tension spring 13 and switch 19, the second arm 11b of the rear sensing lever 11 is positively guided in a recess 10c of the forward sensing lever 10 by means of a bolt 25 and a washer 24.

The initial position of the thickness sensor—sensing lever 10,11—is determined by an abutment 20 which extends into the path of movement of the forward sensing lever 10. The abutment 20 which can be electromagnetically operated is located in a plane in front of the sensing levers 10 and 11. Its position is shown in dash-dotted lines in FIGS. 1 and 2. The abutment 20 extends permanently into the path of movement of the forward sensing lever 10 and is only temporarily moved electromagnetically in opposition to the force of a spring for releasing said sensing lever. In order that the released sensing lever 10 can return from its sensing position according to FIG. 2 to its initial position according to FIG. 1, a diverting member 10b in the form of an inclined surface is molded to sensing lever 10 as can be seen in particular in FIG. 3. When sensing lever 10 pivots back to its initial position its diverting member 10b urges the abutment 20 aside in opposition to the spring force so that sensing lever 10 can pass. When the initial position according to FIG. 1 has been reached the abutment 20 is once again spring-biased to its position in front of sensing lever 10 (see FIG. 1).

The device functions as follows:

Mounting arm 4 is located in an initial position not illustrated in which suction plate 21 is outside the supply magazine 1. By vertical displacement of guide portion 22 along guide column 23 the device is shifted in the direction of the arrows "D" until the suction plate 21 is placed opposite to a selected, open supply magazine 1. When mounting arm 4 is pivoted counterclockwise the suction plate 21 is pivoted into the supply magazine 1 and placed in the position illustrated in FIG. 1 in which the sensing levers 10 and 11 are in their retracted initial positions illustrated in FIG. 1.

When the suction plate 21 has entered the supply magazine 1 it is aligned by cable line 8 in the position shown in dash-dotted lines in FIG. 1. Subsequently the suction plate 21 is moved onto the uppermost sheet film of the sheet-film stack 3 in that the total device is lowered along guide column 23.

When the suction elements 6 are in their lowered position they are subjected to a vacuum so that they attract a sheet film 3a. Subsequently the cable line 8 is relieved so that suction plate 21 is pivoted to its tilted position shown in FIG. 1 by the spring force acting on it. As a result of the pivotal movement of suction plate 21 the front area of sheet film 3a attracted is bent in the manner shown in FIG. 1 and in this way released from the underlying sheet film stack 3. This release operation is enhanced by the action of air blown onto the front edge of the sheet film 3a. Now suction plate 21 remains for the time being in this stand-by position.

Prior to the released sheet film 3a being removed from supply magazine 1, it is checked in this stand-by position whether a single sheet film has been properly released. For this purpose the sensing levers 10 and 11 are released in that abutment 20 is electromagnetically retracted. The forward sensing lever 10, which under the action of its rotary spring is pivoted counterclockwise together with the rear sensing lever 11 hinged to it, is thus brought into the sensing position shown in FIG. 2.

During this pivotal movement of the sensing levers 10 and 11 the area of sheet film 3a which has been bent by the suction plate 21 is moved between the rollers 15 and 17 of the sensing levers 10 and 11. The rollers 15, 17 are urged apart whereby the rear sensing lever 11 is pivoted counterclockwise in opposition to the action of tension spring 13, and the position of its actuating arm 11b relative to the forward sensing lever 10 is changed.

If no more than one sheet film 3a is located between the rollers 15, 17 and the arrangement functions as intended this pivotal movement is not great enough to actuate switch 19 by means of actuating arm 11b of the rear sensing lever 11. In such a case the sheet film 3a is immediately removed from the supply magazine 1 in that the mounting arm 4 leaving its stand-by position pivots clockwise. During such movement the forward sensing lever 10 and, via said lever, the rear sensing lever 11 hinged to it are also taken along via projection 5b of outrigger 5. During that pivotal movement suction plate 21 removes the attracted sheet film 3a from the supply magazine 1 and advances it to further guide means not illustrated which are connected with mounting arm 4. After the separated sheet film 3a has been completely removed from supply magazine 1 and is held on the guide means not illustrated the complete sheet-film removal device together with the thickness sensor 4, 5, 21, 10, 11 as well as the guide means not illustrated which hold the sheet film 3a are moved to a loading position not shown in that guide portion 22 is vertically shifted along guide column 23. In the loading position the direction of pivotal movement of mounting arm 4 is reversed and the separated sheet film 3a guided by suction plate 21, which pivots counterclockwise, along the guide means not illustrated and shifted into an open single-film magazine not illustrated. When the vacuum acting on suction plate 21 is switched off sheet film 3a drops into the single-film magazine, and the complete sheet-film removal device as well as the thickness sensor and the guide means return to an initial position opposite to a supply magazine 1.

If during bending of the sheet film 3a according to FIG. 2 a second sheet film adhering to the first sheet is bent off as well this is detected by the thickness sensor 10, 11, 15, 17, 19 still within the supply magazine 1. In such a case the rollers 15, 17 are urged further apart by the greater thickness of the bent sheet film section so that the actuating arm 11b of the rear sensing lever 11 covers a greater pivotal path and thereby actuates switch 19. This triggers an interruption of the removal operation such that the vacuum on suction elements 6 is switched off and the complete sheet-film removal device 4, 5, 21 is first lifted into its stand-by position and then pivoted out of the supply magazine 1 by clockwise rotation of the mounting arm 4.

When the vacuum is switched off the suction elements 6 release the sheet film 3a along with the second sheet film adhering to it so that the sheets can drop back onto sheet-film stack 3. The mounting arm 4 pivots the whole sheet-film removal device 4, 5, 21 clockwise into a predetermined initial position and, rotating counter-clockwise, pivots it back into the position in the supply magazine 1 which is illustrated in FIG. 1 and in which the suction plate 21 is lowered onto the sheet-film stack 3 in a straight position (shown in dash-dotted lines) and is once again subjected to a vacuum. Subsequently another release operation is carried out as described in that the loading end of the film is bent and air blown in and another thickness measurement is carried out in the standby position in that the sensing levers 10 and 11 are released.

It is assumed that a sheet film adhering to another sheet film—or two further sheet films thus adhering—is released when it is returned onto the sheet-film stack 3, freshly bent and subjected to the air so that only a single sheet film 3a is not attracted by the suction plate 21 in a functionally proper manner.

Should a second thickness measurement reveal that two or more sheets once again adhere to each other the release operation is repeated up to three times. If after such repetition the sheets continue to adhere to each other a corresponding error signal is displayed on the apparatus.

In contrast to the embodiment described the thickness sensor can also be guided on suction device 4 and 5 so as to be shiftable parallely with the bent section of the sheet film 3a (not illustrated) and otherwise designed analogously to the embodiment described.

We claim:

1. A device for detecting double sheets in an apparatus for separating a sheet film from a sheet-film stack, preferably a stack contained in a supply magazine, having a suction device which separates the sheet film to be removed by bending a front area of the film which is engaged by the suction device, with respect to the sheet film plane, and for removing the front area film from the stack, characterized in that a thickness sensor (10, 11, 15, 17, 19) is moved into the bent front area of the sheet film (3a) to a sending position while said film is still located on the sheet-film stack (3).

2. A device according to claim 1, characterized in that the thickness sensor comprises levers (10, 11) which enclose in a forklike manner the bent front area of the sheet film (3a).

3. A device according to claim 1, characterized in that the thickness sensor comprises a first and a second lever (10 and 11 respectively), the first lever (10) having one end which is pivotable about a journal (9) and another end which senses the position of upper surface of the bent front area of the sheet film 3a, the second lever (11) comprising a two-armed lever hinged to the first lever (10) so as to be pivotable about a journal (12) and the second lever (11) having a first lever arm (11a) having and end which serves the position of a lower surface of the bent front area of the sheet film 3a.

4. A device according to claim 3, characterized in that the second lever (11) having a second lever arm (11b) associated with a switch (19), the second lever (11) being spring-biased into contact with the first lever (10) in the sensing position associated with the bent front area of the sheet film (3a).

5. A device according to claim 3, characterized in that at the ends of the levers (10, 11) associated with the sensing area, rollers (15 and 17 respectively) are mounted which are associated with the upper and lower surfaces respectively of the bent front position of sheet film (3a).

6. A device according to claim 3, characterized in that the second lever (11) is positively guided on the first lever (10) in an area of the second lever arm (11b), which is associated with a switch (19).

7. A device according to claim 1, characterized in that the first lever (10) of the thickness sensor (10, 11) and the suction device (4, 5, 6, 21) are arranged so as to be pivotable about a journal (9).

8. A device according to claim 1, characterized in that a first and a second abutment (5b and 20 respectively) are arranged on the suction device (4, 5, 6, 21), said first and second abutments extending into a path of movement of the thickness sensor (10, 11), the first abutment (5b) being associated with the sensing position of thickness sensor (10, 11) and the second abutment (20) being associated with an initial position of thickness sensor (10, 11), the second abutment (20) being designed such that the second abutment can be moved out of the path of movement of thickness sensor (10, 11).

9. A device according to claim 8, characterized in that an inclined surface (10b) is molded to the first lever (10), said inclined surface being arranged obliquely to a plane of movement of said first lever and associated with second abutment 20.

10. A device according to claim 1, characterized in that the thickness sensor is arranged on a shiftable mounting member which is guided in parallel with the bent off front area of the sheet film (3a).

* * * * *